United States Patent
Quan et al.

(10) Patent No.: US 9,357,562 B2
(45) Date of Patent: May 31, 2016

(54) CONTENTION BASED RESOURCE CONFIGURATION METHOD AND APPARATUS

(75) Inventors: Wei Quan, Shenzhen (CN); Qiao Zhang, Shenzhen (CN); Guanglin Han, Shenzhen (CN); Yi Jiang, Shenzhen (CN); Jian Zhang, Shenzhen (CN); Zhongbin Qin, Warsaw (PL)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 13/539,166

(22) Filed: Jun. 29, 2012

(65) Prior Publication Data

US 2012/0263095 A1    Oct. 18, 2012

Related U.S. Application Data

(63) Continuation of application No. PCT/CN2010/080557, filed on Dec. 31, 2010.

(30) Foreign Application Priority Data

Dec. 31, 2009  (CN) .......................... 2009 1 0238879
Dec. 31, 2009  (CN) .......................... 2009 1 0238884
Dec. 31, 2009  (CN) .......................... 2009 1 0238885

(51) Int. Cl.
*H04W 4/00*      (2009.01)
*H04W 74/00*    (2009.01)
(Continued)

(52) U.S. Cl.
CPC ........ *H04W 74/006* (2013.01); *H04W 52/0216* (2013.01); *H04W 52/0219* (2013.01); *H04W 74/0833* (2013.01); *H04W 72/00* (2013.01); *Y02B 60/50* (2013.01)

(58) Field of Classification Search
USPC .......... 370/331, 333, 338, 329, 352; 455/436, 455/445, 440, 441
See application file for complete search history.

(56) References Cited

U.S. PATENT DOCUMENTS

2003/0210668 A1   11/2003   Malladi et al.
2007/0115878 A1*   5/2007   Ashish et al. ................. 370/329
(Continued)

FOREIGN PATENT DOCUMENTS

CN           1996806 A      7/2007
CN         101005695 A      7/2007
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.2.0, Sep. 2007, 109 pages.
(Continued)

*Primary Examiner* — Zewdu A Beyen
(74) *Attorney, Agent, or Firm* — Slater Matsil, LLP (57) ABSTRACT

A contention based resource configuration method is disclosed. The method includes: configuring, by a network device, a contention based resource parameter, wherein the contention based resource parameter comprises one or any combination of the following: a period and/or a frequency of a contention based resource block, the number of contention based resource blocks allocated once, a size of the contention based resource block, a modulation and coding scheme, and expected reception power; and notifying, by the network device, a user equipment of the contention based resource parameter. Through the technical solutions provided by the embodiments of the present invention, a network side may allocate a contention based resource more properly, and the user equipment may know the contention based resource parameter and use the contention based resource more properly and flexibly.

20 Claims, 6 Drawing Sheets

(51) Int. Cl.
*H04W 52/02* (2009.01)
*H04W 74/08* (2009.01)
*H04W 72/00* (2009.01)

(56) References Cited

U.S. PATENT DOCUMENTS

| | | |
|---|---|---|
| 2007/0217370 A1 | 9/2007 | Soong et al. |
| 2008/0049813 A1* | 2/2008 | Kurose ............... H04L 1/0016 375/141 |
| 2008/0085680 A1* | 4/2008 | Kim et al. .................. 455/69 |
| 2009/0080380 A1 | 3/2009 | Chun et al. |
| 2009/0088148 A1 | 4/2009 | Chung et al. |
| 2009/0092086 A1 | 4/2009 | Lee et al. |
| 2009/0116434 A1 | 5/2009 | Lohr et al. |
| 2009/0196240 A1 | 8/2009 | Frederiksen et al. |
| 2009/0259910 A1 | 10/2009 | Lee et al. |
| 2009/0311967 A1 | 12/2009 | Takase et al. |
| 2010/0067412 A1* | 3/2010 | Kitazoe et al. ............. 370/294 |
| 2010/0103867 A1* | 4/2010 | Kishiyama ......... H04W 52/146 370/320 |
| 2010/0111028 A1 | 5/2010 | Kim et al. |
| 2010/0232385 A1* | 9/2010 | Hsu ........................... 370/329 |
| 2011/0026625 A1 | 2/2011 | Susitaival et al. |
| 2011/0039568 A1* | 2/2011 | Zhang et al. ............. 455/452.1 |
| 2011/0292895 A1 | 12/2011 | Wager et al. |

FOREIGN PATENT DOCUMENTS

| | | |
|---|---|---|
| CN | 101355788 A | 1/2009 |
| CN | 101364925 A | 2/2009 |
| CN | 101411240 A | 4/2009 |
| CN | 101426271 A | 5/2009 |
| CN | 101569115 A | 10/2009 |
| EP | 1 816 883 A1 | 8/2007 |
| EP | 2112845 A1 | 10/2009 |
| JP | 2009-525644 A | 7/2009 |
| JP | 2009-303052 A | 12/2009 |
| JP | 2010530171 A | 9/2010 |
| JP | 2011-520378 A | 7/2011 |
| WO | 2007087842 A1 | 8/2007 |
| WO | 2007091676 A1 | 8/2007 |
| WO | 2008153365 A2 | 12/2008 |
| WO | 2008157799 A2 | 12/2008 |
| WO | 2009136830 A1 | 11/2009 |
| WO | WO 2010057540 A1 * | 5/2010 |

OTHER PUBLICATIONS

3$^{rd}$ Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.5.0, Mar. 2009, 43 pages.

Extended European Search Report received in Application No. 10840601.8-2412, Applicant: Huawei Technologies Co., Ltd., mailed Jan. 16, 2013, 11 pages.

Nokia Siemens Networks, "TP to 36.912 on Relays and Carrier Aggregation," 3GPP TSG-RAN WG2 Meeting #66bis, R2-094083, Los Angeles, U.S.A., Jul. 3-29, 2009, 6 pages.

International Search Report received in Patent Cooperation Treaty Application No. PCT/CN2010/080557, mailed Apr. 7, 2011, 4 pages.

Written Opinion received in Patent Cooperation Treaty Application No. PCT/CN2010/080557, mailed Apr. 7, 2011, 3 pages.

Ericsson, et al., "Contention Based Uplink Transmissions," 3GPP TSG-RAN WG2 #66bis, R2-093812, Los Angeles, CA, Jun. 29-Jul. 3, 2009, 4 pages.

Shang, Y.L., "Study of MAC and Resource Management in Wireless Broadband Networks," Globe Thesis, posted on Mar. 9, 2007, 4 pages.

Chinese Office Action received in Application No. 200910238879.2, mailed Mar. 5, 2013, 7 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP TS 36.300, V9.1.0, Sep. 2009, 165 pages.

"3rd Generation Partnership Project; Technical Specification Group RAdio Access Network; Evolved Universal Terrestrial Radio Access (E-UTRA) Medium Access Control (MAC) protocol specification (Release (9))," 3GPP TS 36.321, V9.0.0, Sep. 2009, 47 pages.

"3rd Generation Partnership Project; Technical Specification Group Radio Access Network; Feasibility study for Further Advancements for E-UTRA (LTE-Advanced) (Release 9)," 3GPP TR 36.912, V9.1. 0, Dec. 2009, 58 pages.

Decision of Rejection received in Japanese Application No. 2012-546347 mailed Apr. 22, 2014, 6 pages.

LTE, "Contention Based Uplink Resources for LTE," Apr. 2009, pp. 1-23.

* cited by examiner

CONTENTION BASED RESOURCE CONFIGURATION METHOD AND APPARATUS

This application is a continuation of co-pending International Application No. PCT/CN2010/080557, filed Dec. 31, 2010, which designated the United States and was not published in English, and which claims priority to Chinese Application No. 200910238879.2, filed Dec. 31, 2009, Chinese Application No. 200910238884.3, filed Dec. 31, 2009, Chinese Application No. 200910238885.8, filed Dec. 31, 2009, all of which applications are incorporated herein by reference.

TECHNICAL FIELD

The present invention relates to the field of communications, and in particular, to a contention based resource configuration technology.

BACKGROUND

In a communication system, several solutions are proposed in order to reduce delay in a signaling plane and a user plane. The technical solutions include: reducing a scheduling period of an RACH (random access channel, Random Access Channel), reducing a period of a PUCCH (physical uplink control channel, Physical Uplink Control Channel), reducing processing delay of a UE (User Equipment, user equipment) and an eNB (Evolved Node B, evolved node B), and using a CB (Contention Based, contention based) resource for uplink transmission.

The use of the CB resource for uplink transmission enable a small amount of data to be fast and effectively transmitted when there is no dedicated uplink transmission resource. The CB resource is not dedicated to a single UE, and can be used for all UEs in a cell.

A method for using a CB resource for uplink transmission is that: an eNB notifies, through a dedicated identifier CB-RNTI (Contention Based Radio Network Temporary Identifier, contention based radio network temporary identifier), all UEs in a cell of a contention based resource grant, and after detecting the CB resource, the UEs may perform uplink transmission on the CB resource. Especially, in a case of low network load, a user can implement uplink transmission of data as soon as possible through CB resource allocation.

However, at present, the CB resource is allocated through granting of the CB resource at a physical layer, which results in inappropriate resource allocation, and causes high energy consumption or great conflict when a UE uses the CB resource.

SUMMARY OF THE INVENTION

These Embodiments of the present invention provide a CB resource configuration method and apparatus, so as to reduce the energy consumption when a UE uses a CB resource.

An embodiment of the present invention provides a CB resource configuration method, where the method includes:

configuring, by a network device, a CB resource parameter, where the CB resource parameter includes one or any combination of the following: a period and/or a frequency of a CB resource block, the number of CB resource blocks allocated once, a size of the CB resource block, a modulation and coding scheme MCS, and expected reception power; and notifying, by the network device, a UE of the CB resource parameter.

An embodiment of the present invention provides a CB resource using method, where the method includes:

receiving, by a user equipment UE, a contention based CB resource parameter sent by a network side, where the CB resource parameter includes one or any combination of the following: a frequency and/or a period of a CB resource block, the number of CB resource blocks allocated once, a size of the CB resource block, an MCS (Modulation and Coding Scheme, modulation and coding scheme), and expected reception power; and using, by the UE, a CB resource according to the CB resource parameter.

An embodiment of the present invention provides a network device, where the network device includes:

a configuration module, configured to configure a CB resource parameter, where the CB resource parameter includes one or any combination of the following: a period and/or a frequency of a CB resource block, the number of CB resource blocks allocated once, a size of the CB resource block, an MCS, and expected reception power; and a sending module, configured to notify a UE of the CB resource parameter configured by the configuration module.

An embodiment of the present invention provides a user equipment, where the user equipment includes:

a receiving module, configured to receive a CB resource parameter sent by a network side, where the CB resource parameter includes one or any combination of the following: a frequency and/or a period of a CB resource block, the number of CB resource blocks allocated once, a size of the CB resource block, an MCS, and expected reception power; and a use module, configured to use a CB resource according to the CB resource parameter received by the receiving module.

In the CB resource configuration method provided by the embodiment of the present invention, the CB resource parameter are configured, so that the specific frequency and/or period of the CB resource block, number of the CB resource blocks allocated once, size of the CB resource block, and the MCS may be configured when the CB resource is allocated, and thereby, the UE can know the CB resource parameter, which reduces energy consumption and avoids transmission conflict. In the CB resource using method provided by the embodiment of the present invention, the CB resource is used according to the CB resource parameter, so that the CB resource is used more properly, and energy consumed in detection of the CB resource is reduced.

BRIEF DESCRIPTION OF THE DRAWINGS

To illustrate technical solutions in embodiments of the present invention or in the prior art more clearly, accompanying drawings for describing the embodiments or the prior art are introduced briefly in the following. Apparently, the accompanying drawings in the following description are only some embodiments of the present invention, and persons of ordinary skill in the art can derive other drawings from these accompanying drawings without creative efforts.

DETAILED DESCRIPTION OF ILLUSTRATIVE EMBODIMENTS

The technical solutions in the embodiments of the present invention are clearly and completely described in the following with reference to the accompanying drawings. It is obvious that the embodiments to be described are only part rather than all of the embodiments of the present invention. All other embodiments obtained by persons of ordinary skill in the art based on the embodiments of the present invention without creative efforts should fall within the protection scope of the present invention.

The following embodiments of the present invention take an LTE-A (Long Term Evolution Advance, long term evolution) system for example, but are not limited to the applications in the LTE-A system, and may also be applied in other wireless communication systems, such as an LTE system and a UMTS system.

Figure 1:
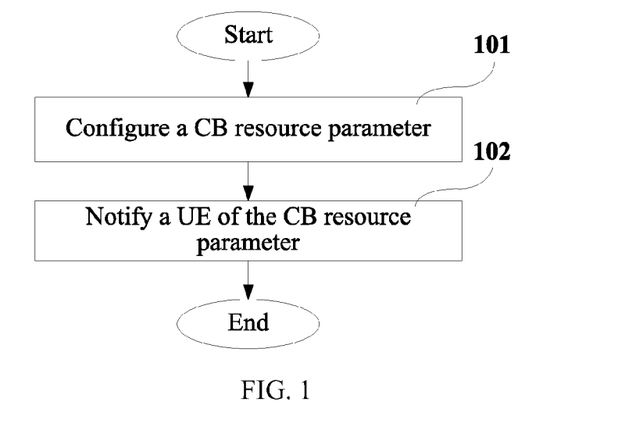
FIG. 1 is a schematic flow chart of a CB resource configuration method according to an embodiment of the present invention.

As shown in FIG. 1, an embodiment of the present invention provides a CB resource configuration method, where the method includes:

Step 101: A network device configures a CB resource parameter, where the CB resource parameter includes one or any combination of the following: a period and/or a frequency of a CB resource block, the number of CB resource blocks allocated once, a size of the CB resource block, a modulation and coding scheme MCS, and expected reception power.

In this embodiment, the configuring the CB resource parameter may be, for example, performed at an RRC layer and/or an MAC layer. The configuring the CB resource parameter at the RRC layer and/or the MAC layer is generally semi-static configuration, thereby ensuring that the CB resource parameter remains unchanged in a certain period of time, so that a UE uses a CB resource more regularly.

Step 102: The network device notifies a UE of the CB resource parameter.

In this embodiment, the network device notifies the UE of the configured CB resource parameter through, for example, one or any combination of a system broadcast message, an RRC (Radio Resource Control, radio resource control) message, MAC (Media Access Control, media access control) layer signaling, or physical layer signaling. The physical layer signaling may be, for example, PDCCH (Physical Downlink Control Channel, physical downlink control channel) signaling.

In this embodiment, according to the number of the CB resource blocks allocated once in the CB resource parameter configured by the network device, the network device may allocated multiple CB resource blocks in one TTI (Transmission Time Interval, transmission time interval). In addition, in order that the UE can know that the network side allocates more than one CB resource block in one TTI, the network device may notify the UE that the network side allocates multiple CB resource blocks. A notification method of the network device may be: in step 102, when notifying the UE of the configured CB resource parameter, notifying the UE of the number of the CB resource blocks configured in one TTI. Thereby, according to the number, the UE may use a CB-RNTI for blind detection. In this way, the UE may detect multiple CB Grants, rather than stops the blind detection after the UE detects only one CB Grant. In addition, the method for notifying the UE that multiple CB resource blocks are allocated in one TTI by the network device may also be: directly notifying the UE of detecting more than one CB Grant, or directly notifying the UE of detecting all CB Grants. In this case, the UE may detect all the CB Grants according to the notification, or stops detection after detecting a certain number of the CB Grants according to the requirements of the UE itself. Further, the network side may further notify the UE of an area of blindly detecting the CB Grants, so as to reduce the times of the blind detection by the UE, and reduce energy consumption in the blind detection.

In this embodiment, the network device configures the CB resource parameter, which may make the UE use the CB resource more conveniently and flexibly, and facilitates the use of the CB resource by the UE for retransmission, and meanwhile, may make the UE reduce the times of detection of the CB resource, thereby saving some energy.

In this embodiment, the frequency and/or period of the CB resource block is configured, which may make the UE know a specific rule of emerging of the CB resource, thereby reducing the times of blind detection by the UE, and facilitating the retransmission by the UE. Moreover, For a UE in a DRX (Discontinuous Reception, discontinuous reception) mode, it is further facilitated that the UE wakes up at a specific time and uses the CB resource, which thereby avoids that power consumption of the UE is increased because of frequent activation of a UE in a sleep mode. In addition, as the UE can know the CB resource parameter, the UE can use the CB resource more properly, for example, selecting use of the CB resource or an SR (Scheduling Request, scheduling request) resource/RACH resource for uplink transmission, or properly determines to send data or a BSR (Buffer Status Report, buffer status report).

In this embodiment, the number of the CB resource blocks allocated once is configured, so that the UE may know the number of the CB resource blocks allocated once, so as to blindly detect multiple CB resource, and select CB resource from the multiple CB resource for use, which reduces a probability of conflict.

In this embodiment, the expected reception power on the CB resource is configured. The network device notifies the UE of the expected reception power, so that the UE may adjust transmit power according to the expected reception power, thereby reducing a block error rate in transmission by using the CB resource.

In this embodiment, the network device may further detect one or any combination of the following: conflict on the CB resource, a block error rate on the CB resource, and a utilization rate of the CB resource. Corresponding to different detection objects, the network device may perform different judgments and operations, the specific implementation of which may include one or any combination of the following operations.

When the network device detects that the probability of the conflict on the CB resource is greater than or equal to a first threshold, the network device the number of the CB resource blocks allocated once in the CB resource parameters, or does not allocate the CB resource any more.

For example, when the network device detects that the probability of the conflict on the CB resource is greater than 30%, the network device increases the number of the CB resource blocks allocated in one TTI from the original 2 to 3, or allocates 0 CB resource block. Since the available CB resource is increased, the UE has more options in using the CB resource, so as to avoid the conflict on the CB resource and improve transmission efficiency. Or, as the CB resource is not allocated any more, the UE can perform the uplink transmission only through a dedicated resource, thereby avoiding a great deal of retransmission due to the conflict on the CB resource.

When the network device detects that the probability of the conflict on the CB resource is greater than or equal to a second threshold, the network device reduces the period of the CB resource block in the CB resource parameter, and/or increases the frequency of the CB resource block, or does not allocate the CB resource any more, which thereby may avoid the conflict on the CB resource.

When the network device detects that the block error rate on the CB resource is greater than or equal to a third threshold, the network device may increase the number of CB resource blocks allocated once in the CB resource parameter, thereby avoiding the conflict and then achieving an effect of reducing the block error rate.

When the network device detects that the block error rate on the CB resource is greater than or equal to a fourth threshold, the network device may modify the MCS in the CB resource parameter.

When the network device detects that the block error rate on the CB resource is greater than or equal to a fifth threshold, the network device may adjust the expected reception power, thereby reducing the block error rate.

When the network device detects that the utilization rate of the CB resource is less than or equal to a sixth threshold, the network device may increase the number of CB resource blocks allocated once in the CB resource parameter.

When the network device detects that the utilization rate of the CB resource is less than or equal to a seventh threshold, the network device may increase the period of the CB resource block in the CB resource parameter, thereby reducing waste of the CB resource and saving network resource.

When the network device detects that the utilization rate of the CB resource is less than or equal to an eighth threshold, the network device may reduce the frequency of the CB resource block in the CB resource parameter.

The first threshold to the eighth threshold may be different from each other or may be all the same, or may be partially the same. The first threshold to the eighth threshold may be preset, or adjusted by the network side according to actual situations, or sent by a core network.

In combination with FIG. 2, a CB resource allocation method provided by an embodiment of the present invention is described in detail in the following, where the method includes:

Step 301: A network device allocates a CB resource in one or more first sub-frames in an uplink frame from a relay station to a base station, where a first sub-frame corresponds to a sub-frame that cannot be set as an MBSFN (Multimedia Multicast/Broadcast Single Frequency Network, multimedia multicast/broadcast single frequency network) sub-frame in a downlink frame from the base station to the relay station.

When a relay station exists, part of the sub-frames in the downlink frame from the relay station to the base station may be set as MBSFN sub-frames, where the sub-frames are used for downlink transmission between the relay station and the base station. Part of the sub-frames cannot be set as MBSFN sub-frames. Specific sub-frames may be selected from the uplink frame between the relay station and the base station, and the CB resource is allocated in these specific sub-frames. In the selection of the specific sub-frame, a sub-frame in the downlink frame corresponding to the specific sub-frame cannot be set as an MBSFN sub-frame.

For example, in the downlink frame used for downlink transmission between an eNB and the relay station, No. 0, 4, 5 and 9 sub-frames cannot be set as MBSFN sub-frames, and then eNB allocates one or more CB resources in one or more of No. 4, 8, 9 and 3 sub-frames in the uplink frame.

In this embodiment, a transmission resource between the eNB and the relay station may be fully utilized. As part of the sub-frames in the downlink frame cannot be set as MBSFN sub-frames, the CB resource is allocated in all or part of the sub-frames which are in the uplink frame and correspond to this part of the sub-frames, and the sub-frames may be fully utilized.

Step 302: The network device allocates the CB resource in one or more second sub-frames in an uplink frame from a UE to the relay station, where a second sub-frame corresponds to an MBSFN sub-frame in a downlink frame from the base station to the relay station.

When the relay station exists, part of the sub-frames in the downlink frame from the relay station to the base station may be set as MBSFN sub-frames, where the sub-frames are used for downlink transmission between the relay station and the base station, and cannot be used for downlink transmission between the UE and the relay station. Part of the sub-frames cannot be set as MBSFN sub-frames. Specific sub-frames may be selected from the uplink frame between the UE and the relay station, and the CB resource is allocated in these specific sub-frames. In the selection of the specific sub-frame, the specific sub-frame corresponds to the MBSFN sub-frame in the downlink frame from the base station to the relay station.

For example, in the downlink frame used for downlink transmission between the eNB and the relay station, one or more of No. 1, 2, 3, 6, 7 and 8 sub-frames are set as MBSFN sub-frames, and then the eNB allocates one or more CB resources in one or more of No. 5, 6, 7, 0, 1 and 2 sub-frames in the corresponding uplink frame from the UE to the relay station.

In this embodiment, an executing entity of step 301 and step 302 may be the relay station or the base station, that is, the allocation of the CB resource may be implemented by the relay station or the base station. When the relay station performs resource allocation, the resource allocation may be independent from that of the base station or may be dependent on that of the base station. When the relay station implements CB resource allocation, the resource allocation may be more flexibly. When the eNB implements the CB resource allocation, the implementation complexity of the relay station may be simplified and the cost of the relay station may be reduced, which facilitates wide setting of the relay station.

In this embodiment, a transmission resource between the relay station and the UE may be fully utilized.

This embodiment, and the foregoing and following embodiments may all be applied in a relay scenario. When the application is in the relay scenario, the relay station may be regarded as a network device, or the relay station may also be regarded as a UE.

In this embodiment, no necessary relationship exists between step 301 and step 302, and step 301 and step 302 may exist independently or at the same time. That is, only step 301 may be performed, or only step 302 may be performed; when step 301 and step 302 are both performed, there is no specific sequence for the execution. When step 301 and step 302 exist at the same time, a dependence relationship may exist between step 301 and step 302, or no dependence relationship exists between step 301 and step 302.

Figure 2:
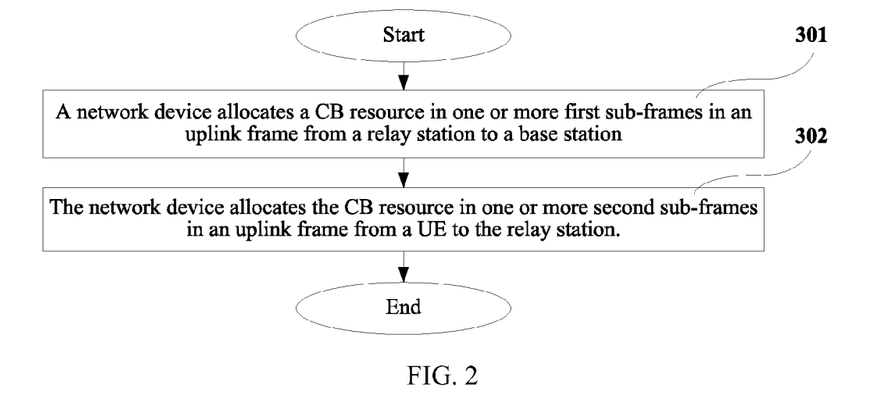
FIG. 2 is a schematic flow chart of a CB resource allocation method according to an embodiment of the present invention.

Further, the embodiment shown in FIG. 2 may be combined with the embodiment shown in FIG. 1, that is, the network device allocates the CB resource in the first sub-frame and/or the second sub-frame according to the CB resource parameter configured in the embodiment shown in FIG. 1.

In combination with FIG. 3, a CB resource using method provided by an embodiment of the present invention is described in detail in the following, where the method includes:

Step 501: A UE receives a CB resource parameter sent by a network side.

In this embodiment, the CB resource parameter includes one or any combination of the following: a frequency and/or a period of a CB resource block, the number of CB resource blocks allocated once, a size of the CB resource block, an MCS, and expected reception power.

The CB resource parameter sent by the network side may include a specific number of CB resource blocks allocated once, or may not include the specific number of the CB resource blocks allocated once while includes an indication of the number of the CB resource blocks, where the indication may be used for informing the UE that only one or more than one CB resource block is allocated once, but not the specific number. In addition, the indication of the number of the CB resource blocks may be included in the CB resource parameter, or sent in other signaling.

In this embodiment, the UE may receive the CB resource parameter sent by the network side by receiving, for example, system broadcast, an RRC message, MAC layer signaling, or physical layer signaling.

Specifically, the CB resource parameter may be implemented in combination with the foregoing embodiments.

Step 502: The UE uses a CB resource according to the CB resource parameter.

In this embodiment, in step 501, the UE may know, according to the CB resource parameter, the number N of the CB resource blocks allocated once; and then, in step 502, the UE may blindly detect N CB Grants, or detect CB Grants of a corresponding number according to requirements of the UE or other indications.

Through the CB resource using method provided by this embodiment, the network side may clearly indicate the CB resource parameter configured by the network side for the UE, so that the UE uses the CB resource more properly. For example, the UE may not blindly detect the CB resource in a TTI when the CB resource are not allocated, so as to save power, or the UE may select one from multiple CB resource blocks in a same TTI for uplink transmission, so as to avoid the conflict.

In this embodiment, after sending a BSR on the CB resource according to the CB resource parameter, the UE does not cancel a triggering state of the BSR, but after waiting until receiving acknowledgement information from the network side, cancels the triggering state of the BSR. In the embodiments of the present invention, the acknowledgement information sent by the network side may be ACK or other information indicating correct reception by the network side; and negative acknowledgement information may be NACK or other information indicating incorrect reception by the network side. In the following embodiments, for ease of description, merely ACK and NACK are taken as examples for illustration, to which reference is made for other information indicating correct reception or incorrect reception by the network side.

After sending the BSR on the CB resource according to the CB resource parameter, the UE does not cancel the BSR. If the UE waits for receiving NACK sent by the network side, the UE maintains the triggering state of the BSR, and waits for a subsequent resource and then sends the BSR. The waiting for the subsequent resource may be backing off for a period of time and then using an available resource to send the BSR.

Further, in retransmission of the BSR, the BSR may be updated according to the latest data buffering state and then be sent.

In this embodiment, after the UE uses, according to the CB resource parameter, the CB resource to send the BSR or uplink data, if the BSR is not triggered again, the UE does not use the CB resource to send the uplink data, but uses an SR resource or an RACH resource to request a dedicated resource for sending the uplink data. If the BSR is triggered again, the UE may use the CB resource to send the BSR and/or send the uplink data.

In this embodiment, the UE uses the CB resource according to the CB resource parameter, or only in the case that the BSR is triggered, the UE can send the uplink data and/or the BSR on the CB resource according to the CB resource parameter.

In this embodiment, the UE uses the CB resource according to the CB resource parameter, or if the BSR is not triggered, after a certain period of time from when the uplink data or the BSR is sent on the CB resource last time, the UE can use the CB resource to send the uplink data.

After the BSR or the uplink data is sent on the CB resource, if the BSR is not triggered, it is not allowed to use the CB resource to send the uplink data, so that it may be avoided that a large data block occupies excessive CB resource and the conflict on the CB resource is thereby caused.

In this embodiment, after the UE uses, according to the CB resource parameter, the CB resource to send the BSR or the uplink data, also, if the BSR is not triggered again, the UE does not use the CB resource to send the uplink data in a certain period of time, but uses the SR resource or RACH resource to request the dedicated resource for sending the uplink data, and can use the CB resource again to send the uplink data after the certain period of time is over. The certain period of time may be implemented, for example, by setting a timer, and after the BSR or the uplink data is sent, the timer is started, where the timer may start to time from zero and end timing at a preset time, or may start to time from a preset time and end timing at zero. If a new BSR is triggered before the timer ends timing, the CB resource is used for sending the BSR and/or the uplink data, and the timer is re-started. In addition, the duration of the timer may be a fixed value, and the fixed value may be a random value set by the UE, or may also be a value notified by the network side, or the duration may also be a variation value, where the variation value may be randomly selected by the UE in a certain range or notified by the network side.

In combination with FIG. 4, another CB resource using method provided by an embodiment of the present invention is described in detail in the following, where the method includes:

Step 601: A UE receives a CB resource parameter sent by a network side.

Figure 3:
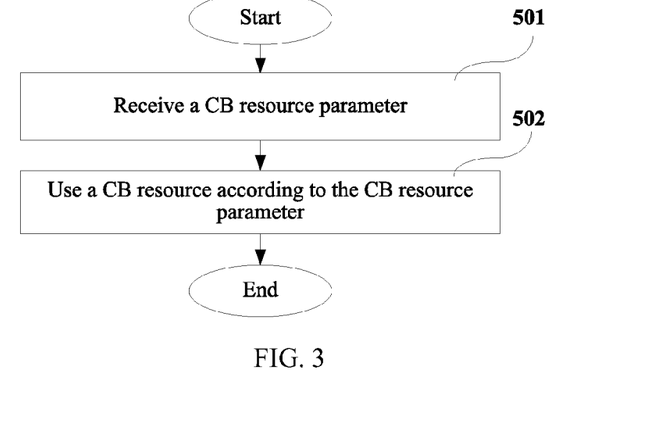
FIG. 3 is a schematic flow chart of a CB resource using method according to an embodiment of the present invention.

Reference may be made to the embodiments shown in FIG. 1 and FIG. 3 for the CB resource parameter.

Step 602: The UE uses a CB resource according to the CB resource parameter and use priority.

In this embodiment, the use priority may include one or any combination of the following: first use priority, second use priority and third use priority. The first use priority may be used for determining a priority level of the CB resource and an SR resource or RACH resource, the second use priority may be used for determining priority of data or a BSR, and the third use priority may be a priority level among multiple CB resources. In the following description, reference is made to the use of the CB resource or the SR resource for the specific implementation of using the CB resource or the RACH resource, and the details are not described herein again.

In this embodiment, the use priority may be determined by the UE, or set and notified by the network side, or preset in the UE.

In this embodiment, when the CB resource parameter indicates that more than one CB resource block is allocated in one TTI or indicate a specific number of the CB resource blocks in one TTI, the UE may perform blind detection on all CB Grants according to a CB-RNTI, or stop the blind detection after detecting a certain number of the CB Grants according to its own requirements. For example, the CB resource parameter indicates that the number of the CB resource blocks allocated in one TTI is 3, the UE may perform blind detection on all the CB Grants, or stop the blind detection after blindly detecting 3 CB Grants, or stop the blind detection after detecting 2 CB Grants according to the requirements of the UE. After the UE detects multiple CB resource Grants (CB Grants), the UE may use the CB resource according to the CB resource parameter and the third use priority. The third use priority includes: randomly selecting one or more CB resources for uplink transmission. Alternatively, the third use priority may further include: selecting one or more CB resources according to a certain rule for uplink transmission. The rule may be, for example, selecting a channel with the best quality or the lowest load, or the lowest required transmit power, or other rules. The UE uses the CB resource according to the third use priority, which may make the UE more flexible in selection of the CB resource, thereby avoiding the conflict in the use of the CB resource, and further improving the use efficiency of the CB resource.

In this embodiment, after the UE knows the condition of the CB resource through the CB resource parameter, when uplink data exists and needs to be sent and the BSR is triggered, the UE judges whether the known CB resource is sufficient to send all the data. If sufficient to send all the data, the CB resource is used for sending the uplink data. In this case, the UE may cancel the BSR. If insufficient to send all the data, the CB resource is used for sending the BSR. The UE uses the CB resource according to the second use priority, which may make the UE use the CB resource more properly, and avoids that in the case of a large amount of data, improper use of the CB resource is caused because the uplink data is sent while the BSR is not sent.

After the UE knows the condition of the CB resource, if the CB resource and the SR resource exist at the same time, the UE may use a resource which is available first, for uplink transmission. For example, when the CB resource is available before the SR resource, the CB resource may be used for sending the uplink data and/or the BSR, and reference is made to the foregoing embodiment for the specific sending manner. Further, when the CB resource is used for uplink transmission, but the ACK sent by the network side is not received, and the SR resource is available, the SR resource may be used for sending a SR.

If the SR resource is available before the CB resource, the SR resource may be used for sending the SR. Further, when the SR is sent but allocation information of a dedicated resource is not received, and the CB resource is available, the CB resource may be used for sending the uplink data and/or the BSR, and reference is made to the foregoing embodiment for the specific sending manner. Further, it may also be cancelled to continue sending the SR.

If the SR resource and the CB resource are both available at the same time, the UE may use the CB resource to send the data and/or the BSR Likewise, when the CB resource is used for uplink transmission but the ACK is not received from the network side, and the SR resource is available, the SR resource may be used for sending the SR.

Further, in this embodiment, after the UE knows the condition of the CB resource, if the CB resource and the SR resource exist at the same time, the SR resource is available before the CB resource, but the CB resource is available after a short period of time, the SR resource may not be used for sending the SR, but the CB resource is used for sending the BSR and/or the uplink data. If the network side delivers a UL Grant (UL Grant) at a moment T1 after the SR is sent on the SR resource, preferably, only when the CB resource is available before T1, the SR resource is not used while the CB resource is used; otherwise, the SR resource is still used. The UE uses the CB resource according to the use priority related to the SR resource and the CB resource, which may make the UE perform the uplink transmission as quickly as possible, and improves the efficiency of the uplink transmission.

Figure 4:
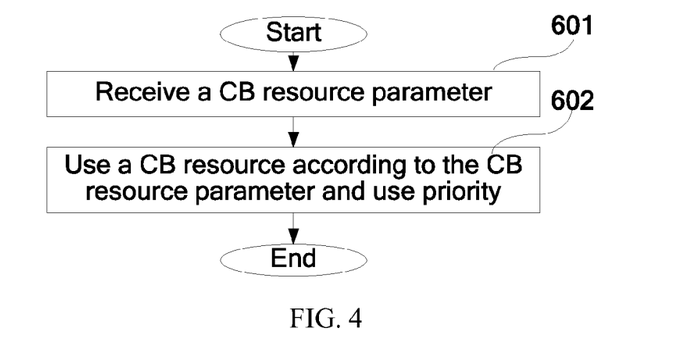
FIG. 4 is a schematic flow chart of another CB resource using method according to an embodiment of the present invention.

The embodiments shown in FIG. 3 and FIG. 4 may be combined, and more embodiments can be obtained after the combination.

In combination with FIG. 5, another CB resource using method provided by an embodiment of the present invention is described in detail in the following, where the method is oriented to a UE in a DRX mode, and includes:

Step 701: A UE receives a CB resource parameter sent by a network side in an activation period, where the CB resource parameter includes a frequency and/or a period of a CB resource block.

Step 702: When uplink data of the UE arrives or a BSR is triggered, the UE wakes up according to the frequency and/or the period of the CB resource block, to monitor a CB resource.

Step 703: If what is sent by the UE on the CB resource includes the BSR, after sending the BSR, the UE maintains an activation state for a period of time, so as to wait for a dedicated resource allocated by the network side.

The maintaining the activation state for a period of time may be implemented by setting a timer. The timer may be set to time from zero to a preset time, or time from the preset time to zero. After the BSR is sent, the timer is started, and the UE may maintain the activation state before the timing is stopped. If the timer is timing when the BSR is sent, the timer may be re-started. After the timer ends timing, the UE may enter a sleep state again. Further, the timer may be started after the BSR is sent and ACK from the network side is received. If the timer is timing when the ACK is received, the timer may be re-started. If the UE sends the BSR and receives NACK, the UE enters a sleep state afterwards. That is, the UE does not start the timer and enters the sleep state.

Figure 5:
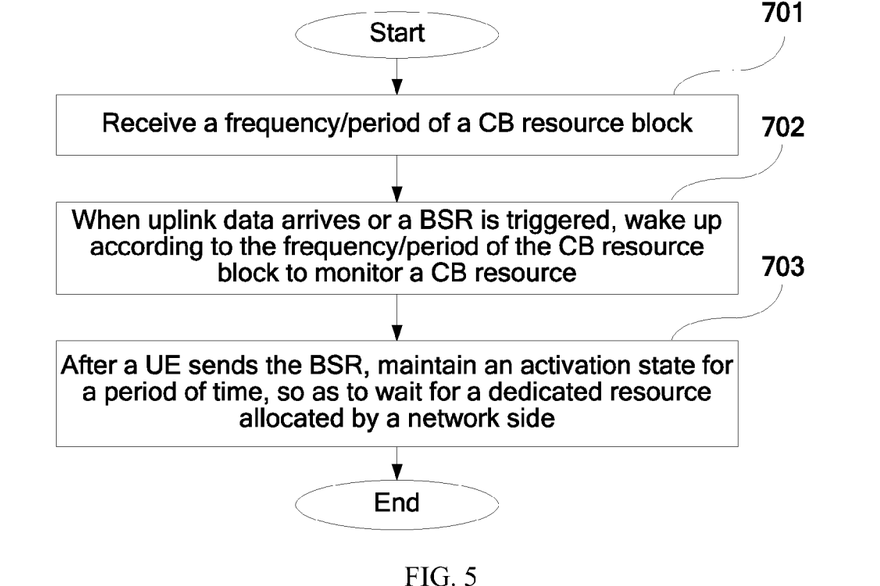
FIG. 5 is a schematic flow chart of another CB resource using method according to an embodiment of the present invention.

The embodiment shown in FIG. 5 may be combined with the embodiments shown in FIG. 3 and FIG. 4, and more embodiments can be obtained through the combination.

In combination with FIG. 6, a transmit power setting method provided by an embodiment of the present invention is described in detail in the following, where the method includes:

Step 801: A UE receives a CB resource parameter sent by a network side, where the CB resource parameter includes expected reception power and/or an MCS.

Step 802: The UE calculates predicted transmit power according to the received CB resource parameter.

Step 803: When the predicted transmit power is greater than or equal to maximum permissible transmit power, the UE performs uplink transmission according to the maximum permissible transmit power; or when the predicted transmit power is less than the maximum permissible transmit power, the UE performs uplink transmission according to the predicted transmit power.

Through the transmit power setting method provided by this embodiment, the UE may adjust the transmit power on a CB resource, so as to reduce a block error rate.

In this embodiment, further, step 803 may not be performed after step 802 is performed, and the uplink transmission may also be directly performed according to the calculated predicted transmit power.

Figure 7:
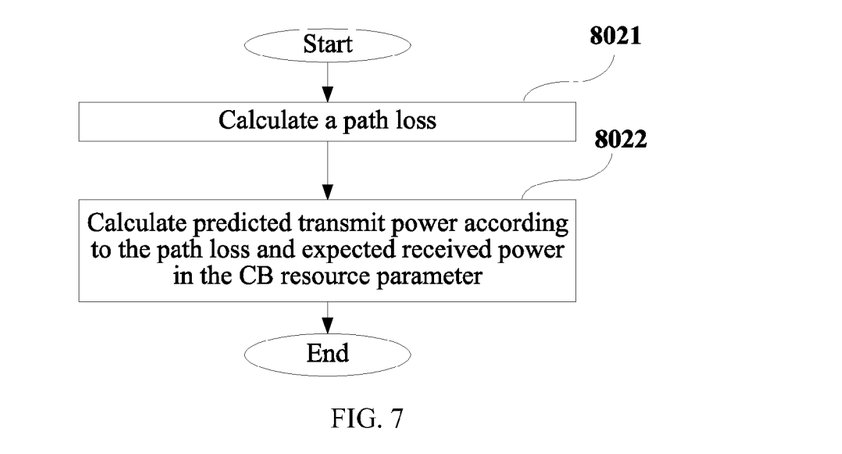
FIG. 7 is a schematic flow chart of a method for calculating predicted transmit power according to an embodiment of the present invention.

In this embodiment, the UE calculates the predicted transmit power according to the received CB resource parameter, which may, for example, include the steps shown in FIG. 7.

Step 8021: The UE calculates a path loss.

In this embodiment, the path loss may be obtained through calculation by the UE according to transmit power and reception power of a downlink pilot.

Step 8022: The UE calculates predicted transmit power on the CB resource according to the path loss and the expected reception power in the CB resource parameter.

In this embodiment, a sending end may calculate the predicted transmit power on the CB resource according to the path loss and the expected reception power in an open loop manner.

Figure 8:
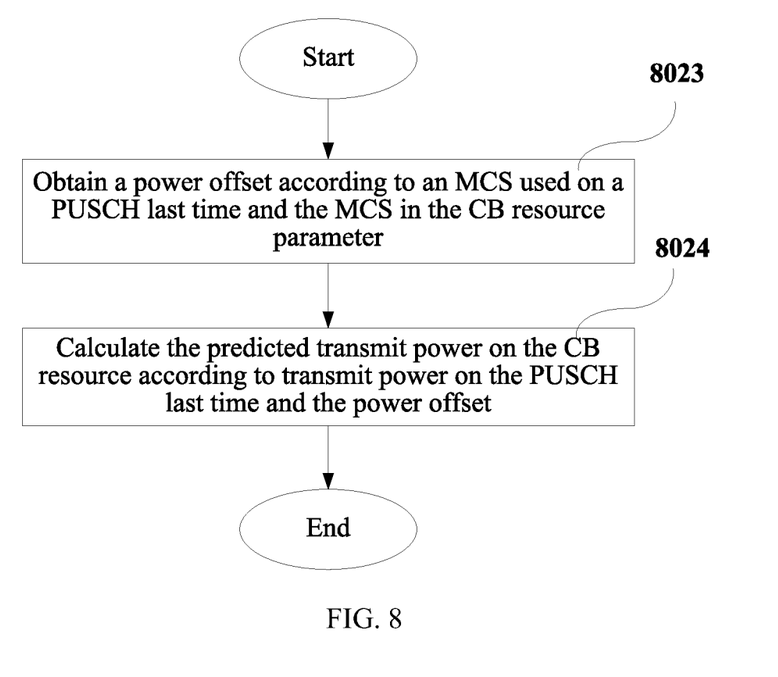
FIG. 8 is a schematic flow chart of another method for calculating predicted transmit power according to an embodiment of the present invention.

In this embodiment, the UE calculates the predicted transmit power according to the received CB resource parameter, which may, for example, include the steps shown in FIG. 8.

Step 8023: The UE obtains a power offset according to an MCS that is used on a physical uplink share channel (Physical Uplink Share Channel, PUSCH) last time, and according to the MCS in the CB resource parameter.

Step 8024: The UE calculates the predicted transmit power on the CB resource according to transmit power on the PUSCH last time and the power offset.

In this embodiment, the sending end may be, for example, in a connection state, and maintains uplink synchronization.

Figure 6:
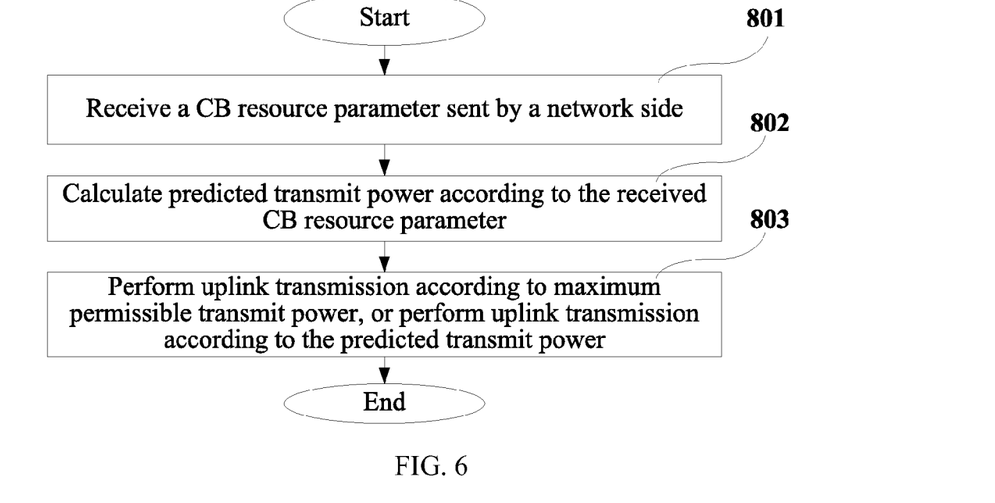
FIG. 6 is a schematic flow chart of a transmit power setting method according to an embodiment of the present invention.

The embodiments shown in FIG. 6, FIG. 7 and FIG. 8 may be combined with the embodiments shown in FIG. 3, FIG. 4 and FIG. 5, and more embodiments may be obtained through the combination. That is, on the basis of the foregoing embodiments, a solution for setting the transmit power of the sending end on the CB resource is added.

Figure 9:
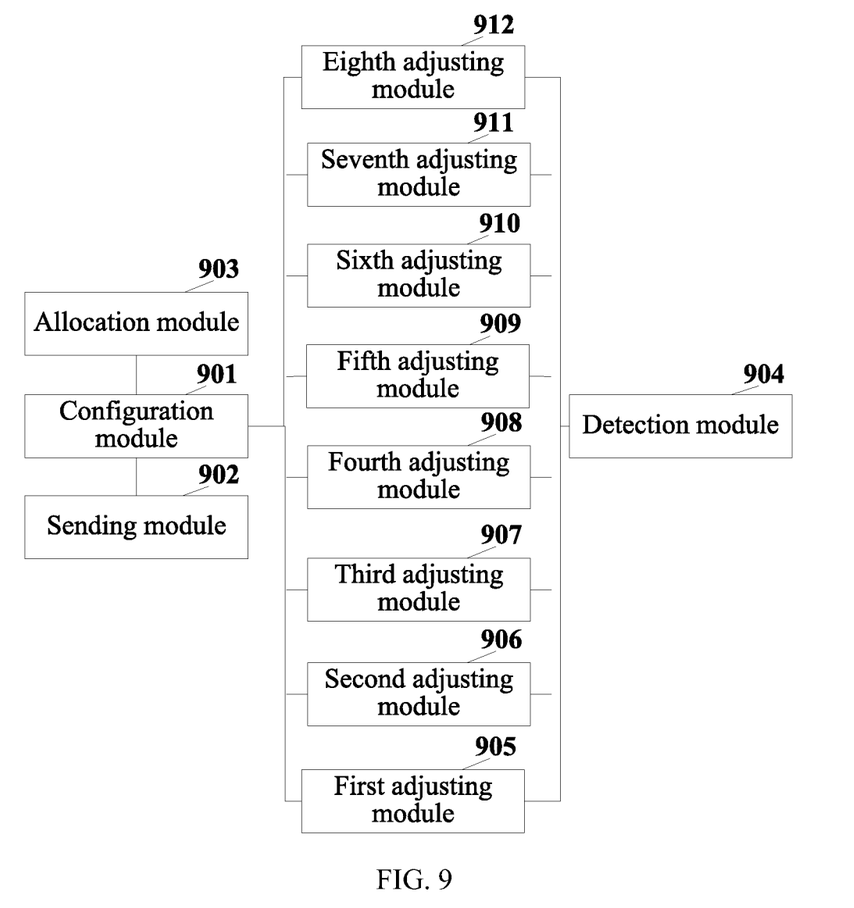
FIG. 9 is a schematic structural diagram of a network device according to an embodiment of the present invention.

In combination with FIG. 9, a network device provided by an embodiment of the present invention is described in detail in the following, where the network device includes:

a configuration module 901, configured to configure a CB resource parameter, where the CB resource parameter includes one or any combination of the following: a period and/or a frequency of a CB resource block, the number of CB resource blocks allocated once, a size of the CB resource block, an MCS, and expected reception power; and a sending module 902, configured to notify a UE of the CB resource parameter configured by the configuration module 901.

In this embodiment, the network device may be, for example, a relay station or a base station. When the network device is a base station, the sending module 902 may be configured to notify the UE of the CB resource parameter, or may also be configured to notify a relay station of the CB resource parameter. When the network device is a relay station, the sending module 902 may be configured to notify the UE of the CB resource parameter.

In this embodiment, the network device may further include, for example, an allocation module 903, configured to allocate a CB resource in a specific sub-frame according to the CB resource parameter configured by the configuration module 901.

The specific sub-frame includes: one or more first sub-frames in an uplink frame from the relay station to the base station, and/or, one or more second sub-frames in an uplink frame from the UE to the relay station. The first sub-frame corresponds to a sub-frame that cannot be set as a multimedia multicast/broadcast single frequency network MBSFN sub-frame in a downlink frame from the base station to the relay station, and the second sub-frame corresponds to an MBSFN sub-frame in the downlink frame from the base station to the relay station.

In this embodiment, the network device may further include, a detection module 904, configured to detect one or any combination of the following: conflict on the CB resource, a block error rate on the CB resource, and a utilization rate of the CB resource.

In this embodiment, the network device may further include, for example, one or any combination of the following modules: a first adjusting module 905, configured to, when the detection module 904 detects that a probability of conflict on the CB resource is greater than or equal to a first threshold, notify the configuration module 901 of increasing the number of CB resource blocks allocated once in the CB resource parameter; a second adjusting module 906, configured to, when the detection module 904 detects that a probability of conflict on the CB resource is greater than or equal to a second threshold, notify the configuration module 901 of reducing the period of the CB resource block in the CB resource parameter, or cancel the CB resource; a third adjusting module 907, configured to, when the detection module 904 detects that a block error rate on the CB resource is greater than or equal to a third threshold, notify the configuration module 901 of increasing the number of CB resource blocks allocated once in the CB resource parameter; a fourth adjusting module 908, configured to, when the detection module 904 detects that a block error rate on the CB resource is greater than or equal to a fourth threshold, notify the configuration module 901 of modifying the MCS in the CB resource parameter; a fifth adjusting module 909, configured to, when the detection module 904 detects that a block error rate on the CB resource is greater than or equal to a fifth threshold, notify the configuration module 901 of adjusting the expected reception power in the CB resource parameter; a sixth adjusting module 910, configured to, when the detection module 904 detects that the utilization rate of the CB resource is less than or equal to a sixth threshold, notify the configuration module 901 of reducing the number of CB resource blocks allocated once in the CB resource parameter; a seventh adjusting module 911, configured to, when the detection module 904 detects that the utilization rate of the CB resource is less than or equal to a seventh threshold, notify the configuration module 901 of increasing the period of the CB resource block in the CB resource parameter; and an eighth adjusting module 912, configured to, when the detection module 904 detects that the utilization rate of the CB resource is less than or equal to an eighth threshold, notify the configuration module 901 of reducing the frequency of the CB resource in the CB resource parameter.

In this embodiment, the configuration module 901 may, for example, configure the CB resource parameter at an RRC layer and/or an MAC layer.

Through the network device provided by the embodiment of the present invention, the CB resource parameter may be configured and notified to the UE, so that the UE can know the CB resource parameter and can flexibly use the CB resource according to the CB resource parameter, which reduces the energy consumption and the transmission conflict.

The network device provided by this embodiment may execute, for example, the CB resource configuration method provided by the embodiment shown in FIG. 1 or FIG. 2.

Figure 10:
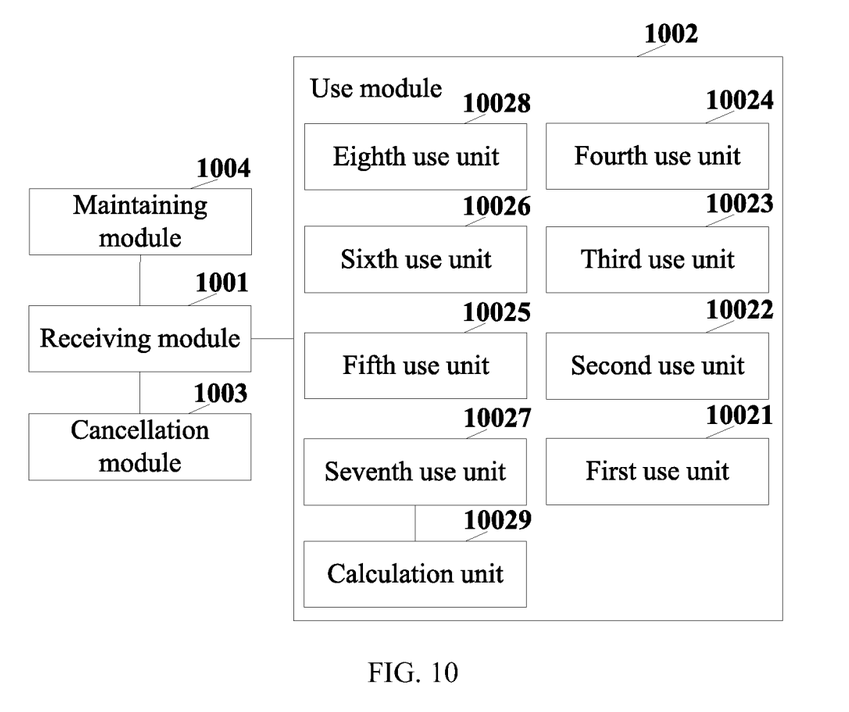
FIG. 10 is a schematic structural diagram of a user equipment according to an embodiment of the present invention.

In combination with FIG. 10, a sending device provided by an embodiment of the present invention is described in detail in the following. The sending device may be, for example, a user equipment or a relay station. When the sending device is a relay station, the network device is a base station, and when the sending device is a user equipment, the network device may be a relay station or a base station.

The sending device includes: a receiving module 1001, configured to receive a CB resource parameter sent by a network side; and a use module 1002, configured to use a CB resource according to the CB resource parameter received by the receiving module 1001.

The CB resource parameter includes one or any combination of the following: a frequency and/or a period of a CB resource block, the number of CB resource blocks allocated once, a size of the CB resource block, an MCS, and expected reception power.

In this embodiment, the use module 1002 may include, for example, an eighth use unit 10028, configured to, according to the number of CB resource blocks allocated once in the CB resource parameter received by the receiving module 1001, blindly detect CB Grants of this number, and use the CB resource when a CB Grant is blindly detected.

The use module 1002 in this embodiment may include, for example, a first use unit 10021, configured to send a BSR on the CB resource according to the CB resource parameter received by the receiving module 1001. In this case, the receiving module 1001 is further configured to receive a feedback on the BSR from the network side. The sending device further includes: a cancellation module 1003, configured to cancel a triggering state of the BSR when the network side feeds back correct reception; and/or a maintaining module 1004, configured to maintain the triggering state of the BSR when the network side feeds back incorrect reception.

The use module 1002 in this embodiment may further include: for example, a second use unit 10022, configured to send the BSR or uplink data on the CB resource according to the CB resource parameter received by the receiving module 1001.

Further, the use module 1002 in this embodiment may further include, for example, a third use unit 10023, configured to, only in a case that the BSR is triggered, send the uplink data and/or the BSR on the CB resource according to the CB resource parameter; and/or a fourth use unit 10024, configured to, if the BSR is not triggered, use the CB resource to send the uplink data after a certain period of time from when the uplink data or the BSR is sent on the CB resource last time. The fourth use unit 10024 may be implemented, for example, by setting a timer.

Further, the use module 1002 in this embodiment may further include, for example, a fifth use unit 10025, configured to use the CB resource according to the CB resource parameter received by the receiving unit 1001 and according to use priority. The use priority includes one or any combination of first use priority, second use priority and third use priority, where the first use priority is used for a priority level of an SR resource or an RACH resource and the CB resource, the second use priority is used for determining a priority level of the BSR or the uplink data, and the third priority is used for determining a priority level among multiple CB resource blocks.

When uplink data exists in the sending device and needs to be sent, and the BSR is triggered, the fifth use unit 10025 uses the CB resource according to the CB resource parameter received by the receiving module 1001 and according to the second priority. Specifically, the fifth use unit 10025 judges, according to the CB resource parameter, whether the CB resource are sufficient to send the uplink data; if sufficient, uses the CB resource to send the uplink data; and if insufficient, uses the CB resource to send the BSR.

When the CB resource and the SR resource or the RACH resource exist at the same time, the fifth use unit 10025 uses the CB resource according to the CB resource parameter received by the receiving module 1001 and according to the first use priority. Specifically, the fifth use unit 10025 knows, according to the CB resource parameter, that the CB resource is available before the SR resource or the RACH resource, and then uses the CB resource to send the uplink data and/or the BSR; or knows, according to the CB resource parameter, that the SR resource or the RACH resource is available before the CB resource, and then uses the SR resource or the RACH resource to request allocation of a dedicated resource; or knows, according to the CB resource parameter, that the SR resource or the RACH resource is available before the CB resource and the CB resource are available before the allocated dedicated resource, and then uses the CB resource to send the uplink data and/or the BSR; or knows, according to the CB resource parameter, that the CB resource and the SR resource or the RACH resource are available at the same time, and then uses the CB resource to send the uplink data and/or the BSR.

In this embodiment, the use module 1002 may further include, for example, a sixth use unit 10026, configured to, when the CB resource parameter received by the receiving module 1001 includes the frequency and/or the period of the CB resource block, and if uplink data arrives or the BSR is triggered, wake up from a sleep state in a discontinuous reception DRX mode according to the frequency and/or the period of the CB resource block, and use the CB resource for uplink transmission.

In this embodiment, the use module 1002 may further include, for example, a calculation unit 10029, configured to, when the CB resource parameter received by the receiving module 1001 includes the expected reception power and/or the modulation and coding scheme, calculate predicted transmit power according to the expected reception power and/or the MCS; and a seventh use unit 10027, configured to, when the predicted transmit power obtained by the calculation unit 10029 is less than maximum permissible transmit power, perform uplink transmission on the CB resource according to the predicted transmit power, or when the predicted transmit power is greater than or equal to the maximum permissible transmit power, perform uplink transmission on the CB resource according to the maximum permissible transmit power.

In this embodiment, the calculation unit 10029 may, for example, calculate the predicted transmit power according to a path loss and the expected reception power in an open loop manner; or calculate the predicted transmit power according to transmit power on a physical uplink share channel (PUSCH) last time, and according to a power offset caused by an MCS used on the PUSCH last time and the MCS used on the CB resource.

Through the sending device provided by this embodiment, the CB resource may be flexibly used according to the CB resource parameter configured by the network side, which may thereby reduce energy consumption and avoid conflict occurring in the uplink transmission.

The sending device provided by this embodiment may be used for executing the methods provided by the embodiments shown in FIG. 3, FIG. 4, FIG. 5, FIG. 6, FIG. 7 and FIG. 8.

Finally, it should be noted that, persons of ordinary skill in the art can understand that all or part of the steps in the methods in the foregoing embodiments may be implemented by a program instructing relevant hardware, and the program may be stored in a computer readable storage medium. When the program is run, the steps of the methods in the foregoing embodiments are performed. The storage medium may be a magnetic disk, an optical disk, a read-only memory (ROM), a random access memory (RAM), and so on.

The functional units in the embodiments of the present invention may be integrated in a processing module, or may also exist as separate physical units; or, two or more of the units may be integrated in one module. The integrated modules may be implemented in a form of hardware or be implemented in a form of software functional modules. If implemented in the form of software functional modules and sold or used as an independent product, the integrated modules may also be stored in a computer readable storage medium. The storage medium may be a read-only memory, a magnetic disk, an optical disk or the like.

The above specific embodiments are not intended to limit the present invention, and for persons with ordinary skill in the art, any modification, equivalent replacement, or improvement made without departing from the principle of the present invention should fall within the protection scope of the present invention.

What is claimed is:

1. A contention based (CB) resource configuration method, the method comprising:
configuring, by a network device, a CB resource parameter, wherein the CB resource parameter comprises a number of CB resource blocks allocated in a single transmission time interval (TTI);
notifying, by the network device, a user equipment (UE) of the CB resource parameter;
allocating, by the network device, a CB resource according to the CB resource parameter;
notifying, by the network device, the UE of a grant of the CB resource after notifying the UE of the CB resource parameter;
detecting, by the network device, a probability of a conflict on the CB resource; and
re-configuring, by the network device in response to the conflict on the CB resource being greater than or equal to a first conflict probability threshold, the CB resource parameter, wherein the re-configuring comprises increasing the number of the CB resource blocks allocated in the single TTI in the CB resource parameter.

2. The method according to claim 1, wherein allocating the CB resource comprises:
allocating, by the network device, the CB resource in a specific sub-frame;
wherein the specific sub-frame comprises a first sub-frame in an uplink frame from a relay station to a base station, or a second sub-frame in an uplink frame from the UE to the relay station; and
wherein the first sub-frame corresponds to a sub-frame that is not allowed to be set as a multimedia multicast/broadcast single frequency network (MBSFN) sub-frame in a downlink frame from the base station to the relay station, and the second sub-frame corresponds to an MBSFN sub-frame in the downlink frame from the base station to the relay station.

3. The method according to claim 1, wherein the CB resource parameter further comprises any one or combination of the following: a period of a CB resource block, a frequency of the CB resource block, a size of the CB resource block, a modulation and coding scheme (MCS), and an expected reception power.

4. A contention based (CB) resource using method, the method comprising:
receiving, by a user equipment (UE) from a network device, a CB resource parameter, wherein the CB resource parameter comprises a number of CB resource blocks allocated in a single transmission time interval (TTI);
detecting, by the UE, a grant of a first CB resource according to the CB resource parameter after receiving the CB resource parameter, wherein the first CB resource is allocated according to the CB resource parameter;
using, by the UE, the first CB resource according to the grant; and
receiving, by the UE, a reconfigured CB resource parameter from the network device, and using a second CB resource allocated according to the reconfigured CB resource parameter to reduce a probability of a conflict on an allocated CB resource, wherein the CB resource parameter is reconfigured in response to the network device detecting a probability of a conflict on the CB resource and determining that the probability of a conflict on the CB resource is greater than or equal to a first conflict probability threshold, and wherein the CB resource parameter is reconfigured by increasing the number of CB resource blocks allocated in the single TTI in the CB resource parameter.

5. The method according to claim 4, wherein:
detecting the grant of the first CB resource according to the CB resource parameter comprises:
blindly detecting, by the UE according to the number of CB resource blocks allocated in the single TTI, CB resource Grants of the number; and
using the first CB resource according to the grant comprises:
using, by the UE, the first CB resource according to the CB resource Grants.

6. The method according to claim 4, wherein using, by the UE, the first CB resource comprises:
sending, by the UE, a buffer status report (BSR) or uplink data on the first CB resource.

7. The method according to claim 6, wherein after the sending the BSR, the method further comprises:
receiving, by the UE, a feedback on the BSR from the network device;
when the feedback is correct reception, canceling, by the UE, a triggering state of the BSR; and
when the feedback is incorrect reception, maintaining, by the UE, the triggering state of the BSR, and waiting for retransmitting.

8. The method according to claim 4, wherein using the CB resource comprises:
using, by the UE, the CB resource according to a use priority, wherein the use priority comprises one or any combination of first use priority, a second use priority and a third use priority, the first use priority is used for determining a priority level of a scheduling request (SR) resource and the first CB resource or a priority level of a random access channel (RACH) resource and the CB resource, the second use priority is used for determining a priority level of a BSR and uplink data, and the third use priority is used for determining a priority level among multiple CB resource blocks.

9. The method according to claim 4, wherein the CB resource parameter further comprises any one or combination of the following: a period of a CB resource block, a frequency of the CB resource block, a size of the CB resource block, a modulation and coding scheme (MCS), and an expected reception power.

10. A network device, comprising:
a processor; and
a computer readable storage medium storing programming for execution by the processor, the programming including instructions to:
configure a contention based (CB) resource parameter, wherein the CB resource parameter comprises a number of CB resource blocks allocated in a single transmission time interval (TTI);
notify a user equipment (UE) of the CB resource parameter;
allocate a CB resource according to the CB resource parameter;
notify the UE of a grant of the CB resource after notifying the CB resource parameter;
detect a probability of a conflict on the CB resource; and
re-configure, in response to the conflict on the CB resource being greater than or equal to a first conflict probability threshold, the CB resource parameter, wherein the re-configuring comprises increasing the number of the CB resource blocks allocated in the single TTI in the CB resource parameter.

11. The network device according to claim 10, wherein the CB resource is allocated in a specific sub-frame—wherein the specific sub-frame comprises a first sub-frame in an uplink frame from a relay station to a base station or a second sub-frame in an uplink frame from the UE to the relay station, and
wherein the first sub-frame corresponds to a sub-frame that is not allowed to be set as a multimedia multicast/broadcast single frequency network (MBSFN) sub-frame in a downlink frame from the base station to the relay station, and the second sub-frame corresponds to an MBSFN sub-frame in the downlink frame from the base station to the relay station.

12. The network device according to claim 10, wherein the CB resource parameter is notified via a radio resource control (RRC) signaling layer or a media access control (MAC) signaling layer.

13. The network device according to claim 10, wherein the CB resource parameter further comprises any one or combination of the following: a period of a CB resource block, a frequency of the CB resource block, a size of the CB resource block, a modulation and coding scheme (MCS), and an expected reception power.

14. A user equipment, comprising:
a processor; and
computer readable storage medium storing programming for execution by the processor, the programming including instructions to:
receive a CB resource parameter from a network device, wherein the CB resource parameter comprises a number of CB resource blocks allocated in a single transmission time interval (TTI);
detect a grant of a first CB resource according to the CB resource parameter after receiving the CB resource parameter, wherein the first CB resource is allocated according to the CB resource parameter;
use the first CB resource according to the grant; and
receive a reconfigured CB resource parameter from the network device and use a second CB resource allocated according to the reconfigured CB resource parameter to reduce a probability of a conflict on an allocated CB resource, wherein the CB resource parameter is reconfigured in response to the network device detecting a probability of a conflict on the CB resource and determining that the probability of a conflict on the CB resource is greater than or equal to a first conflict probability threshold, and wherein the CB resource parameter is reconfigured by increasing the number of CB resource blocks allocated in the single TTI in the CB resource parameter.

15. The user equipment according to claim 14, wherein the instructions to use the first CB resource includes instructions to send a buffer status report (BSR) or uplink data on the first CB resource.

16. The user equipment according to claim 15, wherein the programming further includes instructions to:
receive a feedback on the BSR from the network device;
cancel a triggering state of the BSR when the feedback is correct reception; and
maintain the triggering state of the BSR when the feedback is incorrect reception.

17. The user equipment according to claim 14, wherein the instructions to use the first CB resource-comprises instructions to:
use the first CB resource according to a use priority, wherein the use priority comprises one or any combination of a first use priority, a second use priority and a third use priority, the first use priority is used for determining a priority level of a scheduling request (SR) resource and the first CB resource or a priority level of a random access channel (RACH) resource and the first CB resource, the second use priority is used for determining a priority level of a BSR and uplink data, and the third use priority is used for determining a priority level among multiple CB resource blocks.

18. The user equipment according to claim 14, wherein the programming further includes instructions to:
when the CB resource parameter comprises a frequency or a period of the CB resource block, and uplink data arrives at the UE or a BSR is triggered, wake up from a sleep state in a discontinuous reception (DRX) mode according to the frequency or the period of the first CB resource block before using the CB resource for uplink transmission.

19. The user equipment according to claim 14, wherein the CB resource parameter is received via a radio resource control (RRC) signaling layer or a media access control (MAC) signaling layer.

20. The user equipment according to claim 14, wherein the CB resource parameter further comprises any one or combination of the following: a period of a CB resource block, a frequency of the CB resource block, a size of the CB resource block, a modulation and coding scheme (MCS), and an expected reception power.

* * * * *